United States Patent
Ji (10) Patent No.: US 12,405,935 B2
(45) Date of Patent: Sep. 2, 2025

(54) DATA FUSION METHOD AND APPARATUS BASED ON KNOWLEDGE GRAPH, AND ELECTRONIC DEVICE

(71) Applicant: Siemens Ltd., China, Beijing (CN)

(72) Inventor: Yu Kai Ji, Shanghai (CN)

(73) Assignee: SIEMENS LTD., CHINA, Beijing (CN)

( * ) Notice: Subject to any disclaimer, the term of this patent is extended or adjusted under 35 U.S.C. 154(b) by 0 days.

(21) Appl. No.: 18/043,085

(22) PCT Filed: Aug. 31, 2020

(86) PCT No.: PCT/CN2020/112645
§ 371 (c)(1),
(2) Date: Feb. 27, 2023

(87) PCT Pub. No.: WO2022/041226
PCT Pub. Date: Mar. 3, 2022

(65) Prior Publication Data
US 2023/0315703 A1    Oct. 5, 2023

(51) Int. Cl.
*G06F 16/22* (2019.01)
*G06F 16/24* (2019.01)
(Continued)

(52) U.S. Cl.
CPC .... *G06F 16/2228* (2019.01); *G06F 16/24522* (2019.01); *G06F 16/2457* (2019.01); *G06F 16/288* (2019.01)

(58) Field of Classification Search
CPC ........... G06F 16/2228; G06F 16/24522; G06F 16/288; G06F 16/2457
See application file for complete search history.

(56) References Cited

U.S. PATENT DOCUMENTS 10,083,228 B2   9/2018  Fan ................ G06F 17/30
11,062,700 B1 * 7/2021  Azimi .............. G06N 20/10
(Continued)

FOREIGN PATENT DOCUMENTS

CN    103 995 847      8/2017   ............. G06F 17/30
CN    107491555 A     12/2017   ............. G06F 17/30
(Continued)

OTHER PUBLICATIONS

Graphcool Blog, "How to wrap a REST API with GraphQL". Feb. 22, 2018 (retrieved from https://medium.com/graphcool/how-to-wrap-a-rest-api-with-graphql-8bf3fb17547d on May 2, 2024) (Year: 2018).*

(Continued)

*Primary Examiner* — Mohsen Almani
(74) *Attorney, Agent, or Firm* — Slayden Grubert Beard PLLC (57) ABSTRACT

Various embodiments include a data fusion method based on a knowledge graph. The method may include: mapping an original data structure to a standard data structure; acquiring standard entities and determining attributes contained in the standard entities, wherein the attributes are related to data fields in the standard data structure; establishing associative relationships between the standard entities and generating a knowledge graph with the standard entities as nodes and the associative relationships between the standard entities as edges; and loading the knowledge graph and generating a query mode containing multiple queryable instances, wherein the queryable instances correspond to the edges and/or nodes in the knowledge graph.

17 Claims, 5 Drawing Sheets

(51) Int. Cl.
  *G06F 16/2452* (2019.01)
  *G06F 16/2457* (2019.01)
  *G06F 16/28* (2019.01)

(56) References Cited

U.S. PATENT DOCUMENTS

| | | | | |
|---|---|---|---|---|
| 2012/0158791 | A1* | 6/2012 | Kasneci | G06F 16/9024 707/E17.03 |
| 2015/0324464 | A1 | 11/2015 | Fan | G06F 17/30864 |
| 2018/0039692 | A1 | 2/2018 | Wang et al. | |
| 2018/0121500 | A1* | 5/2018 | Reschke | G06F 16/2428 |
| 2019/0370370 | A1* | 12/2019 | Wittern | G06F 16/24556 |

FOREIGN PATENT DOCUMENTS

| | | | | |
|---|---|---|---|---|
| CN | 107 978 341 | | 5/2018 | G06F 17/30 |
| CN | 108 647 318 | | 10/2018 | G06F 17/30 |
| CN | 108 846 020 | | 11/2018 | G06F 17/30 |
| CN | 109 635 120 | | 4/2019 | G06F 16/36 |
| CN | 110 019 825 | | 7/2019 | G06F 16/36 |
| CN | 110 781 249 | | 2/2020 | G06F 16/28 |
| JP | 2015 212926 | | 11/2015 | G06F 17/30 |
| KR | 2015 0126992 | | 11/2015 | G06F 17/30 |

OTHER PUBLICATIONS

Wittern, Erik, Alan Cha, and Jim A. Laredo. "Generating graphql-wrappers for rest (-like) apis." International Conference on Web Engineering. Cham: Springer International Publishing, 2018 (Year: 2018).*

Ghebremicael, Eyob Semere. Transformation of Rest API to GraphQL for OpenTOSCA. MS thesis. 2017 (Year: 2017).*

Rasool, Saqib, Afshan Saleem, and Adnan Noor Mian. "Poster: Rql: rest query language for converting firebase to a mobile cloud computing platform." Proceedings of the 23rd Annual International Conference on Mobile Computing and Networking. 2017 (Year: 2017).*

Mountantonakis, Michalis et al., "Large-Scale Semantic Integration of Linked Data: A Survey," ACM Computing Surveys, vol. 52, No. 5, Article 103, 40 pages, Sep. 13, 2019.

Janev, Valentina et al., "Knowledge Graphs and Big Data Processing," LNCS 12072, State of the Art Survey, Springer, 212 pages, Jul. 16, 2020.

Extended European Search Report, Application No. 20950895.1, 15 pages, Mar. 21, 2024.

Search Report for International Application No. PCT/CN2020/112645, 6 pages, May 26, 2021.

* cited by examiner

| | | |
|---|---|---|
| Identifier | 217 | |
| Name | Order | |
| | Key | Value |
| | Start time | LocalDataTime |
| | Customer name | String |
| Features | Cut-off time | LocalDataTime |
| | Factory identifier | Long |
| | Order no. | Long |
| | Order state | String |

DATA FUSION METHOD AND APPARATUS BASED ON KNOWLEDGE GRAPH, AND ELECTRONIC DEVICE

CROSS-REFERENCE TO RELATED APPLICATIONS

This application is a U.S. National Stage Application of International Application No. PCT/CN2020/112645 filed Aug. 31, 2020, which designates the United States of America, the contents of which are hereby incorporated by reference in their entirety.

TECHNICAL FIELD

The teachings of the present application relate to the technical field of smart manufacturing. Various embodiments of the teachings herein include data fusion methods and/or apparatus based on a knowledge graph.

BACKGROUND

In smart manufacturing, there are generally many vertical applications which are mainly concentrated on typical field problems, such as how to organize production, how to manage machine resources, etc., how to improve quality, how to increase productivity, etc. The solution to these problems depends on many factors, and there is therefore a need for a method capable of spanning multiple systems/fields to establish knowledge. Trans-field data fusion is one possible solution to this problem. It provides assistance in understanding the knowledge behind data, and establishes links between industrial value chains.

At present, there are a variety of methods capable of performing data fusion among multiple systems. For example, interface designation is performed for each system, one by one, by means of an application program. This requires interface integration to be performed for different systems respectively, and reuse is generally not possible. Another solution is Enterprise Service Bus (ESB), which can establish a channel between different systems, making communication between the systems possible, but it fails to solve the problem of how to connection relationships on the data layer and excavate more data-based knowledge. As another example, it is also possible for all data to be synchronized to one place, to form a data pool, but this requires a lot of work to perform data extraction, transformation and loading (Extract-Transform-Load, ETL), and this fusion data thus obtained is difficult to understand.

SUMMARY

Based on the above, there is a need for a lower-cost data fusion solution. Various embodiments of the teachings of the present disclosure provide data fusion methods and/or apparatus based on a knowledge graph to at least partially solve the abovementioned problems. For example, some embodiments include a data fusion method based on a knowledge graph, comprising: mapping an original data structure to a standard data structure; acquiring standard entities, and determining attributes contained in the standard entities, wherein the attributes contained in the standard entities are related to data fields in the standard data structure; establishing associative relationships between the standard entities, and generating a knowledge graph with the standard entities as nodes and the associative relationships between the standard entities as edges; loading the knowledge graph, and generating a query mode containing multiple queryable instances, wherein the queryable instances correspond to the edges and/or nodes in the knowledge graph.

In some embodiments, the step of mapping an original data structure to a standard data structure comprises: acquiring response information, and mapping a key value structure in the response information to a standard data structure; or acquiring data fields in an original data structure, determining semantics of the data fields in the original data structure, and mapping the original data structure to a standard data structure according to the semantics of the data fields.

In some embodiments, the step of acquiring standard entities comprises: acquiring standard bodies from a preset field standard, and generating standard entities corresponding to the standard bodies.

In some embodiments, the step of acquiring standard entities comprises: receiving an operation of a user, and adding, updating or deleting standard entities in the knowledge graph.

In some embodiments, before the step of loading the knowledge graph, the method further comprises establishing an associative relationship between the standard entity and original data.

In some embodiments, the step of generating a query mode containing multiple queryable instances comprises: determining the nodes and edges in the knowledge graph, and for any node, determining a root type of the node in a graph query language; traversing the edges, and converting the edges to link types in the graph query language according to the root type; traversing the nodes, and for any node, generating a queryable instance corresponding to the node according to the link types.

In some embodiments, the method further comprises: receiving a query sentence, and determining a query object and a filtering condition according to the query sentence; determining a corresponding node from the queryable instances according to the query object and filtering condition; and acquiring information relating to the query object from original data according to the standard entity corresponding to the node.

In some embodiments, when the filtering condition contains a query depth, the method further comprises: determining association depths between the node corresponding to the query object and other nodes, and filtering out other nodes for which the association depth exceeds the query depth.

In some embodiments, before the step of determining a query object and a filtering condition according to the query sentence, the method further comprises converting the received query sentence to a graph query language.

As another example, some embodiments include a data fusion apparatus based on a knowledge graph, comprising: a mapping module, for mapping an original data structure to a standard data structure; an acquisition module, for acquiring standard entities, and determining attributes contained in the standard entities, wherein the attributes contained in the standard entities are related to data fields in the standard data structure; a generating module, for establishing associative relationships between the standard entities, and generating a knowledge graph with the standard entities as nodes and the associative relationships between the standard entities as edges; and a loading module, for loading the knowledge graph, and generating a query mode containing multiple queryable instances, wherein the queryable instances correspond to the edges and/or nodes in the knowledge graph.

In some embodiments, the mapping module acquires response information, and maps a key value structure in the response information to a standard data structure; or acquires data fields in an original data structure, determines semantics of the data fields in the original data structure, and maps the original data structure to a standard data structure according to the semantics of the data fields.

In some embodiments, the acquisition module acquires standard bodies from a preset field standard, and generates standard entities corresponding to the standard bodies.

In some embodiments, the acquisition module receives an operation of a user, and adds, updates or deletes standard entities in the knowledge graph.

In some embodiments, the apparatus further comprises an establishing module, for establishing an associative relationship between the standard entity and original data before the knowledge graph is loaded.

In some embodiments, the loading module determines the nodes and edges in the knowledge graph, and for any node, determines a root type of the node in a graph query language; traverses the edges, and converts the edges to link types in the graph query language according to the root type; traverses the nodes, and for any node, generates a queryable instance corresponding to the node according to the link types.

In some embodiments, the apparatus further comprises a query module, for receiving a query sentence, and determining a query object and a filtering condition according to the query sentence; determining a corresponding node from the queryable instances according to the query object and filtering condition; acquiring information relating to the query object from original data from the standard entity corresponding to the node.

In some embodiments, the apparatus further comprises a filtering module for, when the filtering condition contains a query depth, determining association depths between the node corresponding to the query object and other nodes, and filtering out other nodes for which the association depth exceeds the query depth.

In some embodiments, the apparatus further comprises a conversion module, for converting the received query sentence to a graph query language, before the query object and filtering condition are determined according to the query sentence.

As another example, some embodiments include an electronic device, comprising: one or more processors, a memory, and one or more programs, wherein the one or more programs are stored in the memory and configured to be executed by the one or more processors, the one or more programs comprising for performing one or more of the methods as described herein.

As another example, some embodiments include a non-transient machine-readable storage medium, storing executable instructions which, when executed, cause the machine to perform one or more of the methods as described herein.

As another example, some embodiments include a computer program product, tangibly stored on a computer-readable medium and comprising computer-executable instructions which, when executed, cause at least one processor to perform one or more of the methods as described herein.

BRIEF DESCRIPTION OF THE DRAWINGS

The drawings below illustrate and explain the teachings of the present application schematically, without limiting the scope thereof. In the drawings.

KEY TO THE DRAWINGS

S101: mapping an original data structure to a standard data structure;
S102: acquiring standard entities, and determining attributes contained in the standard entities, wherein the attributes contained in the standard entities are related to data fields in the standard data structure;
S103: establishing associative relationships between the standard entities, and generating a knowledge graph with the standard entities as nodes and the associative relationships between the standard entities as edges;
S104: loading the knowledge graph, and generating a query mode containing multiple queryable instances, wherein the queryable instances correspond to the edges and/or nodes in the knowledge graph;
201: product specification entity;
202: factory entity;
203: demand entity;
204: order entity;
401: sensor;
4011: sensor 1;
4012: sensor 2;
402: heat exchanger;
4021: heat exchanger 1;
4022: heat exchanger 2;
4023: heat exchanger 3;
501: mapping module;
502: acquisition module;
503: generating module;
504: loading module;
505: establishing module;
506: query module;
507: filtering module;
508: conversion module;
1001: processor;
1002: memory; and
1003: display unit.

DETAILED DESCRIPTION

In some embodiments, a data fusion method based on a knowledge graph comprises: mapping an original data structure to a standard data structure; acquiring standard entities, and determining attributes contained in the standard entities, wherein the attributes contained in the standard entities are related to data fields in the standard data structure; establishing associative relationships between the standard entities, and generating a knowledge graph with the standard entities as nodes and the associative relationships between the standard entities as edges; and loading the knowledge graph, and generating a query mode containing multiple queryable instances, wherein the queryable instances correspond to the edges and/or nodes in the knowledge graph.

In some embodiments, a key value structure in the response information is mapped to a standard data structure; or data fields in an original data structure are acquired, semantics of the data fields in the original data structure are determined, and the original data structure is mapped to a standard data structure according to the semantics of the data fields; in this way, it is possible to adapt to original data structures of different types, so the scope of applicability is broader.

In some embodiments, standard bodies are acquired from a preset field standard, and standard entities corresponding to the standard bodies are generated, so as to suit actual operation needs more closely.

In some embodiments, an operation of a user is received, and standard entities are added, updated or deleted in the knowledge graph, so as to meet the user's personalized demands.

In some embodiments, before the knowledge graph is loaded, the method further comprises: establishing an associative relationship between the standard entity and original data; in this way, it is possible to call and acquire original data according to the standard entity, and there is no need to save the original data in the post-fusion data system, so storage resources are saved.

In some embodiments, the nodes and edges in the knowledge graph are determined, and for any node, a root type of the node in a graph query language is determined; the edges are traversed, and the edges are converted to link types in the graph query language according to the root type; the nodes are traversed, and for any node, a queryable instance corresponding to the node is generated according to the link types; in this way, queryable instances in conformity with the graph query language are generated, reducing query complexity for the user and improving the user experience.

In some embodiments, a query sentence is received, and a query object and a filtering condition are determined according to the query sentence; a corresponding node is determined from the queryable instances according to the query object and filtering condition; and information relating to the query object is acquired from original data from the standard entity corresponding to the node, thus realizing quick and precise data query.

In some embodiments, when the filtering condition contains a query depth, association depths between the node corresponding to the query object and other nodes are determined, and other nodes for which the association depth exceeds the query depth are filtered out, so as to increase the query efficiency and reduce invalid information in query results.

In some embodiments, before the query object and filtering condition are determined according to the query sentence, the received query sentence is converted to a graph query language; a broader variety of query methods are thus possible based on the graph query language, for broader applicability.

In some embodiments, a data fusion apparatus based on a knowledge graph comprises: a mapping module, for mapping an original data structure to a standard data structure; an acquisition module, for acquiring standard entities, and determining attributes contained in the standard entities, wherein the attributes contained in the standard entities are related to data fields in the standard data structure; a generating module, for establishing associative relationships between the standard entities, and generating a knowledge graph with the standard entities as nodes and the associative relationships between the standard entities as edges; and a loading module, for loading the knowledge graph, and generating a query mode containing multiple queryable instances, wherein the queryable instances correspond to the edges and/or nodes in the knowledge graph.

In some embodiments, an electronic device comprises: one or more processors, a memory, and one or more programs, wherein the one or more programs are stored in the memory and configured to be executed by the one or more processors, the one or more programs comprising for performing one or more of the methods described herein.

In some embodiments, a storage medium comprises a stored program, wherein, when the program is run, a device comprising the storage medium is controlled to perform one or more of the methods described herein.

By mapping different original data structures to a standard data structure, then representing data fields in the standard data structure as standard entity attributes, and creating a knowledge graph with standard entities as nodes and associative relationships between standard entities as edges by means of the multiple standard entities, an operator can perform self-defined correction of nodes and edges in the knowledge graph according to actual needs, and generate queryable instances by loading the knowledge graph to provide associative query to the outside, thereby achieving data fusion for a variety of heterogeneous data sources, reducing system maintenance and alteration costs, and achieving more lightweight data fusion.

In smart manufacturing, one problem often involves many aspects, and depends on many factors. For this reason, there is often a need for multiple trans-system data, but such trans-system data is often heterogeneous and not directly related, so if data fusion is performed directly by a conventional method, the system obtained by integration is generally quite bloated, and not visually direct for a user. On this basis, the embodiments of the present application provide a data fusion solution based on a knowledge graph, to achieve lightweight data fusion.

Figure 1:
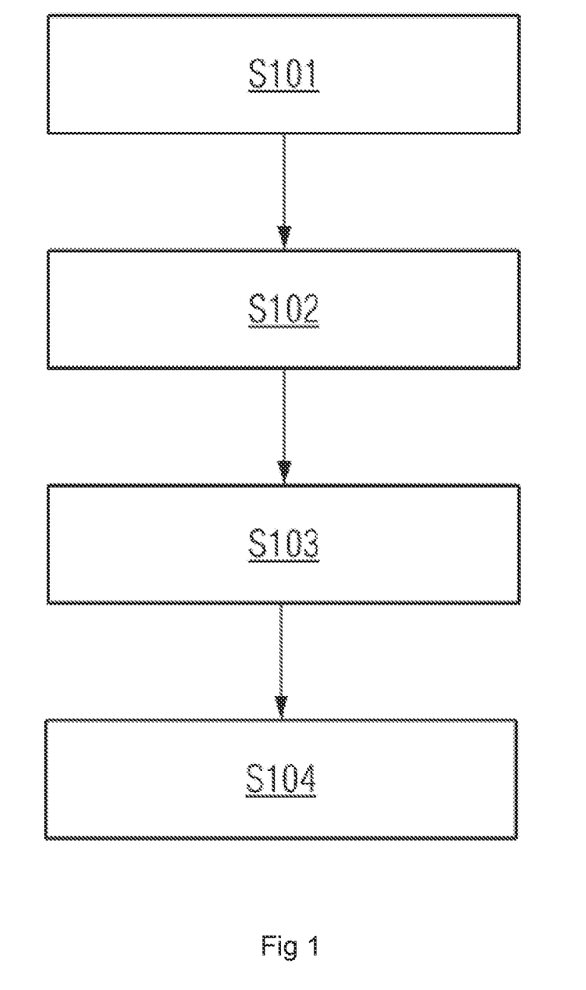
FIG. 1 is a schematic flow chart of a data fusion method based on a knowledge graph incorporating teachings of the present application.

FIG. 1 shows a schematic flow chart of a data fusion method based on a knowledge graph incorporating teachings of the present application.

S101 includes mapping an original data structure to a standard data structure. Here, a variety of original data structures are possible. These original data structures may all be different from one another, i.e. there are multiple heterogeneous original data structures. For example, an original data structure which might be provided by a manufacturing enterprise may be a 2D table, in which the data fields are identifiers, weights and powers, etc. of various devices.

In actual applications, different enterprises might firstly have various tables of different types, based on differences in field, and secondly, even within tables in the same field, the data fields which they might use are not exactly the same. On this basis, it is first necessary to map the original data structure into a standard data structure.

A "standard data structure" includes a data structure whose format and data fields have already been designated. In the mapping process, if the original data structure has some redundant data fields relative to the standard data structure (i.e. data fields which are present in the original data structure but not present in the standard data structure, e.g. data fields which were custom-made by the enterprise based on its own needs), then these redundant data fields will be removed in the mapping process; if the original data structure lacks some data fields relative to the standard data structure, then the values of these data fields may be empty in the standard data structure after mapping.

In actual applications, a mapping relationship between data fields in the original data structure and data fields in the standard data structure may be determined on the basis of the semantics of the two structures.

S102 includes acquiring standard entities, and determining attributes contained in the standard entities, wherein the attributes contained in the standard entities are related to data fields in the standard data structure. The standard entity may be obtained on the basis of a standard body to be used as an industry standard in an actual application. For example, standard bodies based on different fields are first extracted from International Electrotechnical Commission (IEC) standards. For example, the standard IEC62264/ISA95 defines a standard model of a smart manufacturing management system, and a bdy defined as a standard in this system may be extracted and persisted into a standard body component. Then, a standard entity method may be used to represent the standard body, and attributes contained in the standard entity may undergo the abovementioned mapping process, binding data fields in the standard data structure into the standard entity.

Attributes contained in a standard entity may comprise, for example, identifiers, names, and multiple features, etc. Different standard entities contain different features. For example, an order entity might contain the features "start time, end time, transaction state", etc.; and a factory entity might contain the features "address, name, longitude/latitude", etc.

Figure 2:
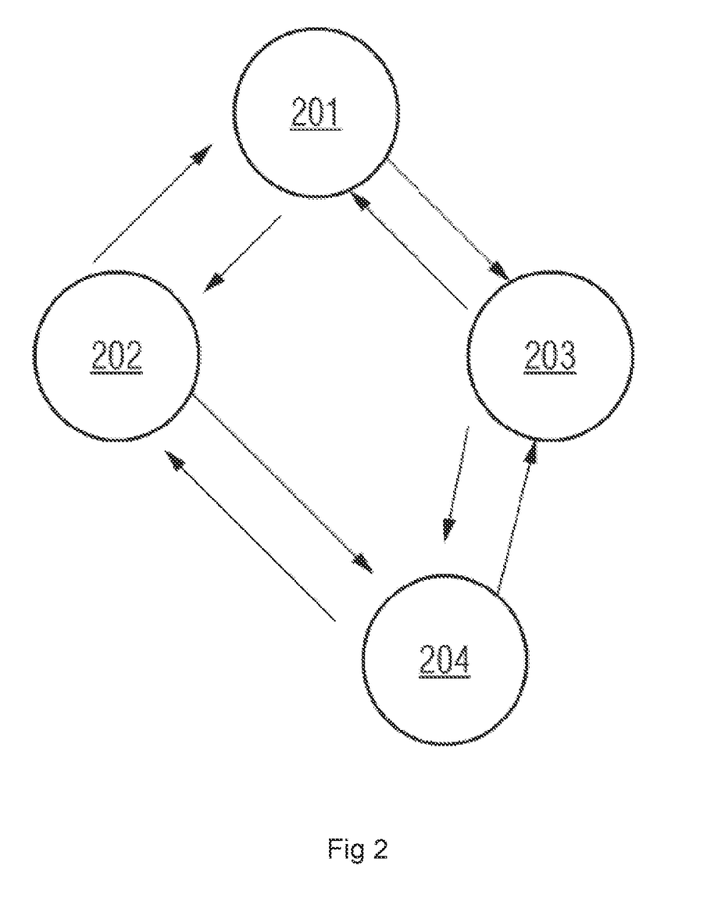
FIG. 2 is a schematic diagram incorporating teachings of the present application for standard entities.

The standard entities may be stored in a graphical database in the form of a pattern, as shown in FIG. 2. FIG. 2 is a schematic diagram of an example embodiment incorporating teachings of the present application for standard entities, showing standard entities for a manufacturing factory extracted on the basis of ISA95 (international standard for enterprise systems and control systems integration, voted through by the Instrumentation, Systems, and Automation Society (ISA) in 1995), and the associative relationship among the standard entities. It has a factory entity to designate factory attributes, and also has a product specification to designate product categories. Other entities, such as materials, assembly line, warehouse and orders, are also very important entities in a manufacturing enterprise.

The standard entities may be selected; for example, when the order entity 204 is selected in FIG. 2, the following may be displayed: attributes of the order, what time manufacturing of the order begins, who the customer is, what time the order ends, and the current state of the order, etc.

Figure 3:
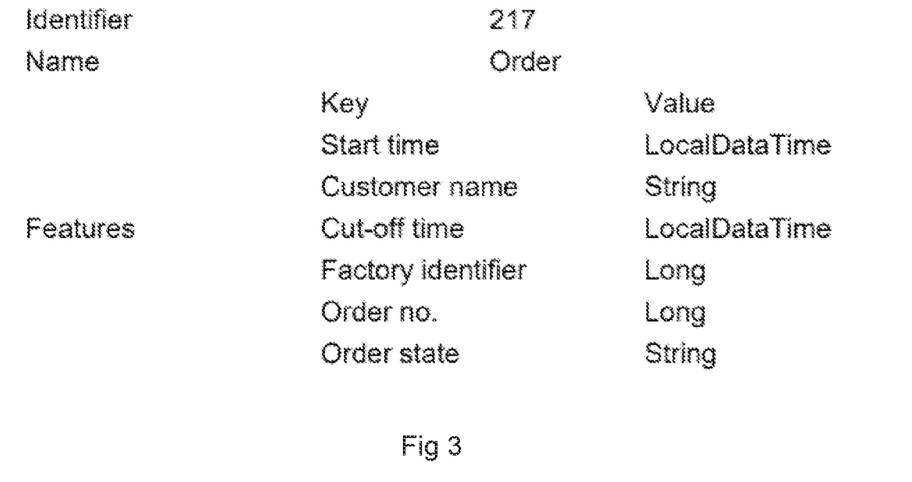
FIG. 3 is a schematic diagram of attributes contained in an order entity incorporating teachings of the present application.

As shown in FIG. 3, FIG. 3 is a schematic diagram of attributes contained in an order entity. In some embodiments, the user may also add, update or delete standard entities according to actual needs and field standards, so as to achieve a personalized entity configuration.

S103 may include establishing associative relationships between the standard entities, and generating a knowledge graph with the standard entities as nodes and the associative relationships between the standard entities as edges. Specifically, the user may establish an associative relationship for standard entities whose attributes have already been determined, based on the standard and actual application circumstances. In other words, each edge of the knowledge graph contains corresponding node information and information on the associative relationship between nodes.

The knowledge graph generated may be saved in a corresponding graphical database, and development management personnel may maintain the entities and inter-entity relationship in the graphical database.

S104 includes loading the knowledge graph, and generating a query mode containing multiple queryable instances, wherein the queryable instances correspond to the edges and/or nodes in the knowledge graph. Specifically, the knowledge graph is stored in a graphical database, and various database suppliers are supported; data in the knowledge graph may be loaded by means of an adapter, to obtain all edges and nodes.

Queryable instances corresponding to edges and/or nodes in the knowledge graph are thereby obtained, and may be stored in internal memory or a cache, thereby generating a query mode containing multiple queryable instances. The user may thus perform a relevant data query based on the query mode.

Figure 4:
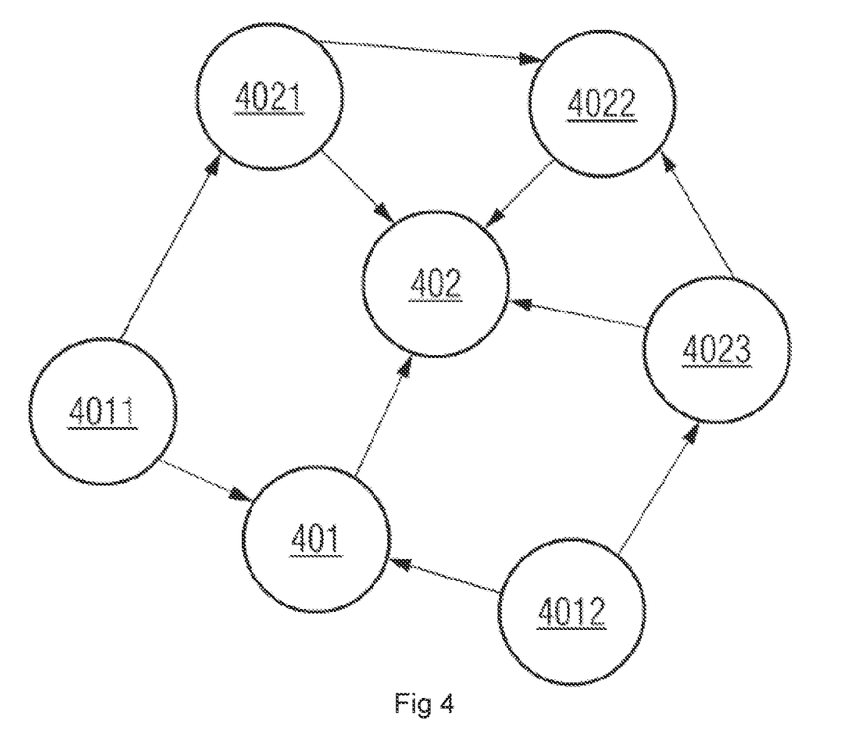
FIG. 4 is a schematic diagram of queryable instances incorporating teachings of the present application.

Below a single standard entity, there might be multiple corresponding instances; for example, in the case of a sensor and a heat exchanger, there are 2 instances below the sensor, and there are 3 instances below the heat exchanger. A relationship might exist between two instances of different entities, and this will be generated according to actual needs. As shown in FIG. 4, FIG. 4 is a schematic diagram of queryable instances provided in an embodiment of the present application. It must be explained that this schematic diagram only shows an associative relationship between two entities; in actual applications, the number of instances which may be contained in one entity is quite large, and associative relationships between entities are very broad.

In this schematic diagram, a sensor 401 and a heat exchanger 402 represent two entities, from which multiple instances are respectively derived. Each edge represents an associative relationship that might exist between two entities or instances. For example, a sensor 4011 pointing toward a heat exchanger 4021 may represent the sensor 4011 "monitoring" the heat exchanger 4021, while the heat exchanger 4021 and a heat exchanger 4023 both pointing toward a heat exchanger 4022 may represent the heat exchanger 4021 and the heat exchanger 4023 being "connected" to the heat exchanger 4022; the sensor 4011 and a sensor 4012 pointing toward the sensor 401 represents them being two instances below the standard entity represented by the sensor 401; and the sensor 401 pointing toward the heat exchanger 402 may represent the sensor 401 monitoring the heat exchanger 402.

In some embodiments, the user may use a Representational State Transfer (REST) interface, i.e. RESTful API, to perform a data query. RESTful refers to a set of architectural constraint conditions and principles. An application program or design that meets these constraint conditions and principles is RESTful.

In some embodiments, for the generation of a query mode containing multiple queryable instances, this may be obtained on the basis of a graph query language (GraphQL). For example, using a GraphQL mode generator, all nodes are first cycled and caused to become GraphQL root types, then all edges are cycled in the GraphQL and linked to all root types to become link types, because the edges contain node information and relationship information. The nodes are then traversed; for any node, a queryable instance corresponding to the node is generated according to the link type. Thus, based on GraphQL language rules, the user can use a GraphQL query sentence to query relevant data.

In some embodiments, by mapping different original data structures to a standard data structure, then representing data fields in the standard data structure as standard entity attributes, and creating a knowledge graph with standard entities as nodes and associative relationships between standard entities as edges by means of the multiple standard entities, an operator can perform self-defined correction of nodes and edges in the knowledge graph according to actual needs, and generate queryable instances by loading the knowledge graph to provide associative query to the outside, thereby achieving data fusion for a variety of heterogeneous data sources, without needing to copy data from an original data source, thus reducing system maintenance and alteration costs, and achieving more lightweight data fusion.

In some embodiments, when mapping the original data structure to the standard data structure, it may be that a key value structure contained in response body information of a Restful response is mapped to the standard data structure, for example a JSON key and value in response body information; or it may be that, taking the original data fields in the original data structure, the original data structure is mapped to the standard data structure according to the semantics of the data fields; specifically, the original data fields and the post-mapping data fields should have the same semantics. In the mapping process, a table corresponding to the original data may also be mapped onto the standard entity. Different mapping paradigms make it possible to adapt to original data structures of different types, so the scope of application is wider.

In some embodiments, before loading the knowledge graph, it is also possible to pre-define how to access a data source. For example, by determining the address of the data source in the graphical database and establishing an associative relationship between an entity and the data source, each standard entity is enabled to access the data source; in this way, there is no need to save the original data in the post-fusion data system, so storage resources are saved.

As stated above, the user may query relevant information in a variety of ways. For example, when the user performs a query by RESTful API, the following query sentences may be used for the query:

```
/entities?root=Plant
&filter=[Plant][!Has_SINAMICS_300_Info,!invert_Plant_Owner][id=2]
&filter=[Device][!Connect_To_SINAMICS_300_Info]
``` where Root is the root entity that the user wishes to search for; for example, if the user wishes to search for factory information, a factory may be designated by a factory identifier here (i.e. id=2). If no other filter is defined after the root entity, the filter filter is the data filtering condition that the user wishes to limit.

It is thus possible, based on a query object and filtering condition, to determine a corresponding node from queryable instances, i.e. determine a corresponding factory instance (i.e. a node) in the knowledge graph, and determine a device instance associated with the factory instance, and then acquire information relating to the query object from the original data from the standard entity corresponding to the node, i.e. return and obtain information that might contain the factory with id=2 itself, and obtain information of a device meeting the condition "Connect_To_SI-NAMICS_300" that is contained in the factory. The filtering condition is used to indicate a parameter that should be returned and associated device information that should be returned.

In some embodiments, when the user uses a GraphQL sentence for a query, the query may be made in the following way:

```
Sensor(id=10) {
    deviceId,
    type,
    listen_on_HeatExchanger( ){
        aliasName,
        id,
        name
    }
}
``` wherein Sensor(id=10) indicates that the query object is the sensor with id=10, and the information that needs to be returned is indicated by the parameters "deviceId, type, listen_on_HeatExchanger", i.e. "device identifier, type, monitored heat exchanger", while the relevant parameters of the "monitored heat exchanger" that should be returned are also indicated by the nested parameters "aliasName,id, name".

In some embodiments, nesting may be performed multiple times in a query; for example, in the above example, the indication parameters for "listen_on_HeatExchanger" may also include defining parameters such as "connect_to_device", thereby indicating the return of another device connected to "listen_on_HeatExchanger".

In some embodiments, when performing an information query, a query depth may also be defined; here, depth means the minimum value of edges passed through when going from one node to another. For example, in the case of adjacent nodes, the depth is 1. By specifying the depth, when a query is performed, association depths between the node corresponding to the query object and other nodes are determined, and other nodes for which the association depth exceeds the query depth are removed by filtering; it is thus possible to define the query depth within a certain range, and in fact, if the association depth between two entities is greater, the correlation therebetween is smaller. Thus, in this way, the query efficiency can be increased, and invalid information in the query result can be reduced.

In some embodiments, before determining the query object and filtering conditions according to the query sentence, the received query sentence may be converted to a graph query language by means of a pre-defined conversion interface. For example, a Restful query sentence is automatically converted to a GraphQL sentence, and the user can thereby directly apply the Restful query sentence for a query; a broader variety of query methods are thus possible based on the graph query language, for broader applicability.

Figure 5:
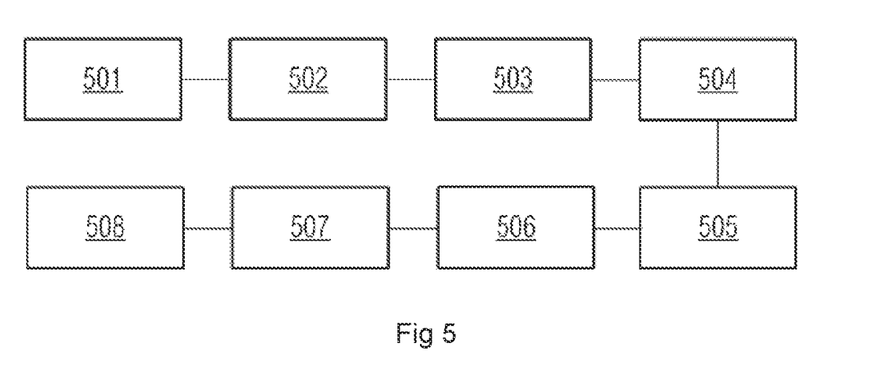
FIG. 5 is a structural schematic diagram of a data fusion apparatus based on a knowledge graph incorporating teachings of the present application.

In some embodiments, there is a data fusion apparatus based on a knowledge graph, as shown in FIG. 5; FIG. 5 is a structural schematic diagram of a data fusion apparatus based on a knowledge graph, the apparatus comprising: a mapping module 501, for mapping an original data structure to a standard data structure; an acquisition module 502, for acquiring standard entities, and determining attributes contained in the standard entities, wherein the attributes contained in the standard entities are related to data fields in the standard data structure; a generating module 503, for establishing associative relationships between the standard entities, and generating a knowledge graph with the standard entities as nodes and the associative relationships between the standard entities as edges; and a loading module 504, for loading the knowledge graph, and generating a query mode containing multiple queryable instances, wherein the queryable instances correspond to the edges and/or nodes in the knowledge graph.

Furthermore, the mapping module 501 acquires response information, and maps a key value structure in the response information to a standard data structure; or acquires a data field in an original data structure, determines semantics of the data field in the original data structure, and maps the original data structure to a standard data structure according to the semantics of the data field.

Furthermore, the acquisition module 502 acquires a standard body from a preset field standard, and generates a standard entity corresponding to the standard body.

Furthermore, the acquisition module 502 receives a user operation, and adds, upgrades or deletes a standard entity in the knowledge graph.

Furthermore, the apparatus further comprises an establishing module 505, for establishing an associative relationship between the standard entity and original data before the knowledge graph is loaded.

Furthermore, the loading module 505 determines nodes and edges in the knowledge graph, and for any node, determines a root type of the node in a graph query language; traverses the edges, and converts the edges to link types in the graph query language according to the root type; traverses the nodes, and for any node, generates a queryable instance corresponding to the node according to the link type.

Furthermore, the apparatus further comprises a query module 506, for receiving a query sentence, and determining a query object and a filtering condition according to the query sentence; determining a corresponding node from the queryable instance according to the query object and filtering condition; and acquiring information relating to the query object from original data from a standard entity corresponding to the node.

Furthermore, the apparatus further comprises a filtering module 507 for, when the filtering condition contains a query depth, determining association depths between the node corresponding to the query object and other nodes, and filtering out other nodes for which the association depth exceeds the query depth.

Furthermore, the apparatus further comprises a conversion module 508, for converting a received query sentence to a graph query language before a query object and filtering condition are determined according to the query sentence.

Figure 6:
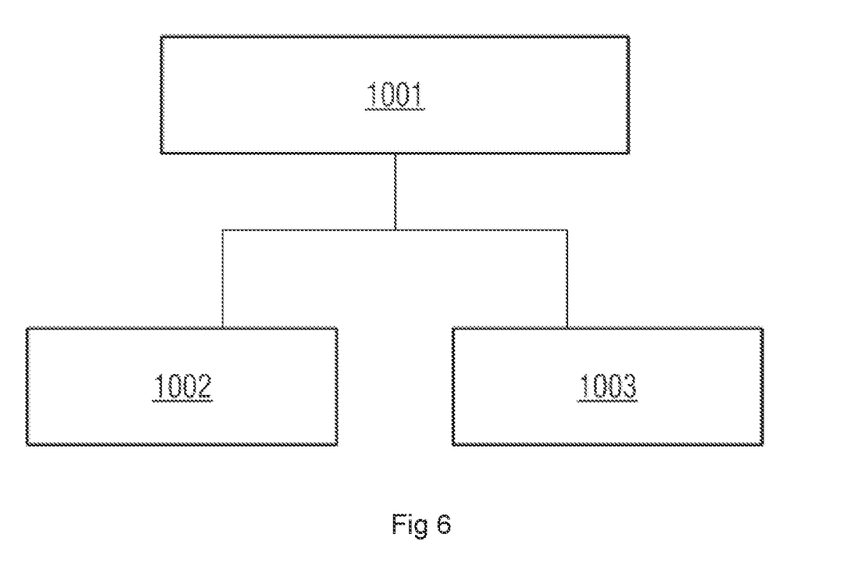
FIG. 6 is a structural schematic diagram of an electronic device incorporating teachings of the present application.

FIG. 6 is a structural schematic diagram of an electronic device incorporating teachings of the present disclosure. As shown in FIG. 6, the electronic device comprises: one or more processors 1001, a memory 1002, a display unit 1003, and one or more programs, wherein the one or more programs are stored in the memory, and configured to be executed by the one or more processors, the one or more programs comprising for performing the method described in any embodiment of the present disclosure.

In some embodiments, a storage medium stores a program, wherein, when the program is run, a device comprising the storage medium is controlled to perform one or more of the methods described in any embodiment of the present disclosure. A computer storage medium may be a computer-readable signal medium or a computer-readable storage medium or any combination of these. The computer-readable medium may for example be, but is not limited to, an electrical, magnetic, optical, electromagnetic, infrared or semiconductor system, apparatus or device, or any combination of these. More specific examples of computer-readable storage media may include but are not limited to: electrical connections having one or more conductive wires, portable computer magnetic disks, hard disks, random access storage media (RAM), read-only media (ROM), erasable programmable read-only storage media (EPROM or flash memory), optic fiber, portable compact magnetic disk read-only storage media (CD-ROM), optical storage media, magnetic storage media, or any suitable combination of these. In the present invention, the computer-readable storage medium may be any tangible medium containing or storing a program, which program may be used by an instruction execution system, apparatus or device or used in combination therewith.

The computer-readable signal medium may comprise a data signal propagated as part of a carrier wave or in a baseband, with computer-readable program code carried therein. This propagated data signal may take various forms, including but not limited to electromagnetic signals, optical signals or any suitable combination of these. The computer-readable signal medium may also be any computer-readable medium other than a computer-readable storage medium, and the computer-readable medium can send, propagate or transmit a program configured to be used by an instruction execution system, apparatus or device or used in combination therewith. The program code contained in the computer-readable medium may be transmitted using any suitable medium, including but not limited to: wireless, electric wires, optic cables, RF, etc., or any suitable combination of these.

It should be understood that although the present disclosure is described according to various embodiments, it is by no means true that each embodiment contains only one independent technical solution. This manner of presentation is adopted herein purely for clarity. Those skilled in the art should consider this specification in its entirety; the technical solutions in different embodiments may also be suitably combined to form other embodiments understandable to those skilled in the art.

The above are merely particular illustrative ways of implementing embodiments of the present disclosure, and are not intended to define the scope of embodiments of the present disclosure. All equivalent changes, revisions and combinations made by any person skilled in the art without departing from the concept and principles of the embodiments of the present invention should be included in the scope of protection of the embodiments of the present disclosure.

What is claimed is:

1. A method comprising:
   mapping an original data structure to a standard data structure by acquiring data fields in an original data structure, determining semantics of the data fields in the original data structure, and mapping the original data structure to a standard data structure according to the semantics of the data fields;
   wherein mapping the original data structure to the standard data structure includes mapping a key value structure contained in response body information of a restful response;
   acquiring standard entities and determining attributes contained in the standard entities, wherein the attributes are related to data fields in the standard data structure;
   establishing associative relationships between the standard entities and generating a knowledge graph with the standard entities as nodes and the associative relationships between the standard entities as edges;
   determining an address of the data source in the graphical database and establishing an associative relationship between an entity and the data source;
   loading the knowledge graph and generating a query mode containing multiple queryable instances, wherein the queryable instances correspond to individual edges and/or nodes in the knowledge graph; and storing the queryable instances in an internal memory or a cache to provide user access by data query;
wherein generating a query mode containing multiple queryable instances comprises:
determining the nodes and edges in the knowledge graph, and for any node, determining a root type of the node in a graph query language comprising GraphQL;
traversing the edges and converting the edges to link types in the graph query language according to the root type as well as defining a query depth indicating a minimum value of edges passed through when going from one node to another; and
traversing the nodes, and for any node, generating a queryable instance corresponding to the node according to the link types.

2. The method as claimed in claim 1, wherein mapping an original data structure to a standard data structure further comprises mapping a key value structure in the original data structure to a standard data structure.

3. The method as claimed in claim 1, wherein acquiring standard entities comprises:
acquiring data sets from a preset field standard; and
generating standard entities corresponding to the data sets.

4. The method as claimed in claim 1, wherein acquiring standard entities comprises:
receiving an operation of a user; and
adding, updating or deleting standard entities in the knowledge graph.

5. The method as claimed in claim 1, wherein, before the step of loading the knowledge graph, the method further comprises establishing an associative relationship between the standard entity and original data.

6. The method as claimed in claim 1, further comprising:
receiving a query sentence and determining a query object and a filtering condition according to the query sentence;
determining a corresponding node from the queryable instances according to the query object and filtering condition; and
acquiring information relating to the query object from original data according to the standard entity corresponding to the node.

7. The method as claimed in claim 6, wherein:
the filtering condition contains a query depth, the query depth specifying a minimum number of edges passed through when traveling from one node to another in the knowledge graph; and
the method further comprises: determining association depths between the node corresponding to the query object and other nodes; and filtering out other nodes for which the association depth exceeds the query depth.

8. The method as claimed in claim 6, wherein, before the step of determining a query object and a filtering condition according to the query sentence, the method further comprises converting the received query sentence to a graph query language.

9. An apparatus based on a knowledge graph, the apparatus comprising executable instructions stored in non-transitory memory, the executable instructions including:
a mapping module for mapping an original data structure to a standard data structure by acquiring data fields in an original data structure, determining semantics of the data fields in the original data structure, and mapping the original data structure to a standard data structure according to the semantics of the data fields;
wherein mapping the original data structure to the standard data structure includes mapping a key value structure contained in response body information of a restful response;
an acquisition module for acquiring standard entities and determining attributes contained in the standard entities, wherein the attributes contained in the standard entities are related to data fields in the standard data structure;
a generating module for establishing associative relationships between the standard entities and generating a knowledge graph with the standard entities as nodes and the associative relationships between the standard entities as edges and determining an address of the data source in the graphical database and establishing an associative relationship between an entity and the data source; and
a loading module for loading the knowledge graph and generating a query mode containing multiple queryable instances, wherein the queryable instances correspond to the edges and/or nodes in the knowledge graph;
wherein generating a query mode containing multiple queryable instances comprises:
determining the nodes and edges in the knowledge graph, and for any node, determining a root type of the node in a graph query language comprising GraphQL;
traversing the edges and converting the edges to link types in the graph query language according to the root type as well as defining a query depth indicating a minimum value of edges passed through when going from one node to another; and
traversing the nodes, and for any node, generating a queryable instance corresponding to the node according to the link types.

10. The apparatus as claimed in claim 9, wherein the mapping module:
acquires input information and maps a key value structure in the input information to a standard data structure; or
acquires data fields in an original data structure, determines semantics of the data fields in the original data structure; and
maps the original data structure to a standard data structure according to the semantics of the data fields.

11. The apparatus as claimed in claim 9, wherein the acquisition module acquires standard data sets from a preset field standard and generates standard entities corresponding to the standard data sets.

12. The apparatus as claimed in claim 9, wherein the acquisition module receives an operation of a user, and adds, updates, or deletes standard entities in the knowledge graph.

13. The apparatus as claimed in claim 9, further comprising an establishing module for establishing an associative relationship between the standard entity and original data before the knowledge graph is loaded.

14. The apparatus as claimed in claim 9, further comprising a query module, for receiving a query sentence, and determining a query object and a filtering condition according to the query sentence; determining a corresponding node from the queryable instances according to the query object and filtering condition; acquiring information relating to the query object from original data from the standard entity corresponding to the node.

15. The apparatus as claimed in claim 14, further comprising a filtering module for, when the filtering condition contains a query depth, the query depth specifying a minimum number of edges passed through when traveling from one node to another in the knowledge graph, determining association depths between the node corresponding to the query object and other nodes, and filtering out other nodes for which the association depth exceeds the query depth.

16. The apparatus as claimed in claim 14, further comprising a conversion module, for converting the received query sentence to a graph query language, before the query object and filtering condition are determined according to the query sentence.

17. An electronic device comprising:
one or more processors;
a memory; and
one or more programs stored in the memory and configured to be executed by the one or more processors;
wherein the one or more programs cause the one or more processors to:
map an original data structure to a standard data structure by acquiring data fields in an original data structure, determining semantics of the data fields in the original data structure, and mapping the original data structure to a standard data structure according to the semantics of the data fields;
wherein mapping the original data structure to the standard data structure includes mapping a key value structure contained in response body information of a restful response;
acquire standard entities and determining attributes contained in the standard entities, wherein the attributes are related to data fields in the standard data structure;
establish associative relationships between the standard entities and generating a knowledge graph with the standard entities as nodes and the associative relationships between the standard entities as edges;
determine an address of the data source in the graphical database and establishing an associative relationship between an entity and the data source;
load the knowledge graph and generating a query mode containing multiple queryable instances, wherein the queryable instances correspond to the edges and/or nodes in the knowledge graph; and
storing the queryable instances in an internal memory or a cache to provide user access by data query;
wherein generating a query mode containing multiple queryable instances comprises:
determining the nodes and edges in the knowledge graph, and for any node, determining a root type of the node in a graph query language comprising GraphQL;
traversing the edges and converting the edges to link types in the graph query language according to the root type as well as defining a query depth indicating a minimum value of edges passed through when going from one node to another; and
traversing the nodes, and for any node, generating a queryable instance corresponding to the node according to the link types.

* * * * *